(12) United States Patent
Godin et al.

(10) Patent No.: US 10,728,877 B2
(45) Date of Patent: Jul. 28, 2020

(54) PAGING WITH OPTIMIZED TRANSMISSION RESOURCES IN A MOBILE NETWORK

(71) Applicant: Alcatel Lucent, Nozay (FR)

(72) Inventors: Philippe Godin, Versailles (FR); Laurent Thiebaut, Antony (FR)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/060,582

(22) PCT Filed: Dec. 8, 2016

(86) PCT No.: PCT/EP2016/080326
§ 371 (c)(1),
(2) Date: Jun. 8, 2018

(87) PCT Pub. No.: WO2017/097932
PCT Pub. Date: Jun. 15, 2017

(65) Prior Publication Data
US 2019/0007926 A1 Jan. 3, 2019

(30) Foreign Application Priority Data
Dec. 11, 2015 (EP) .................................... 15306994

(51) Int. Cl.
*H04W 68/02* (2009.01)
*H04W 68/08* (2009.01)
*H04W 8/02* (2009.01)

(52) U.S. Cl.
CPC ............. *H04W 68/02* (2013.01); *H04W 8/02* (2013.01); *H04W 68/08* (2013.01)

(58) Field of Classification Search
CPC ........ H04W 8/02; H04W 68/02; H04W 68/08
See application file for complete search history.

(56) References Cited

U.S. PATENT DOCUMENTS

2018/0288735 A1* 10/2018 Walldeen .............. H04W 68/02

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), 3GPP Standard; 3GPP TS 36.300, 3rd Generation Partnership Project (3GPP), Mobile Competence Centre ; 650, Route Des Lucioles ; F-06921 Sophia-Antipolis Cedex ; France, vol. RAN WG2, No. V14.0.0, Sep. 29, 2016 (Sep. 29, 2016), pp. 1-314, XP051172664.

(Continued)

*Primary Examiner* — Marcus Hammonds
(74) *Attorney, Agent, or Firm* — Harness, Dickey & Pierce, P.L.C.

(57) ABSTRACT

An embodiment of the invention is a Core Network CN entity such as Mobility Management Entity MME, capable of sending a paging request message such as S1 Paging message to a Radio Access Network RAN entity such as eNodeB, for paging a User Equipment UE, said CN entity configured to:
provide in a paging request message, control information enabling said CN entity to influence the consumption by said RAN entity of radio transmission resources for said paging.

9 Claims, 2 Drawing Sheets

(56) References Cited

OTHER PUBLICATIONS

Figure 1:
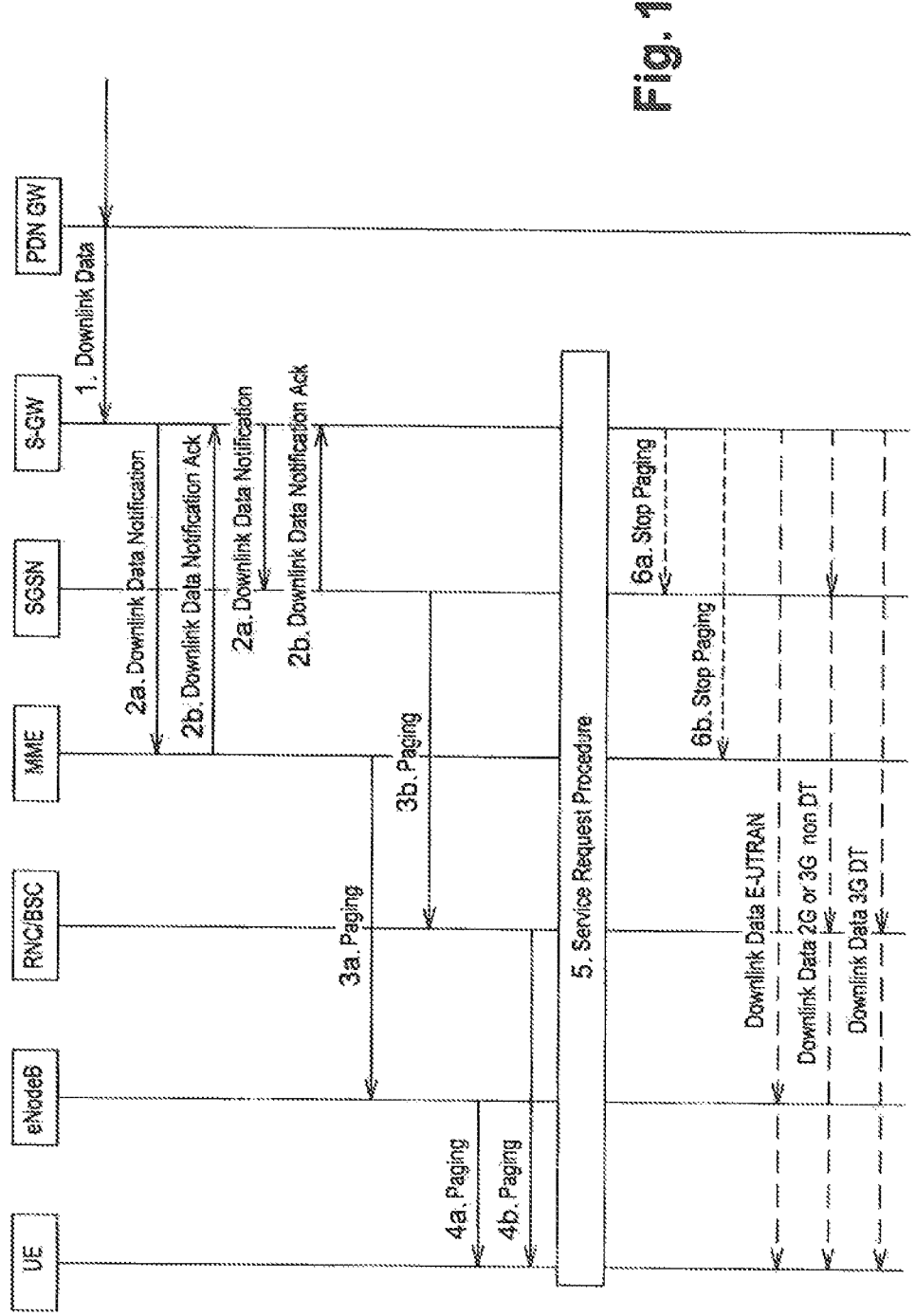

Alcatel-Lucent et al: "Finalization of CE Paging in release 13", vol. RAN WG3, no. Sophia Antipolis, France; Oct. 5, 2015-Oct. 9, 2015, Oct. 2, 2015 (Oct. 2, 2015), XP051007070, Retrieved from the Internet <URL:http://www.3gpp.org/ftp/Meetings_3GPP_SYNC/RAN3/Docs/> [retrieved on Oct. 2, 2015].
Ericsson: "On open topics for paging optimisations", vol. RAN WG3, no. Anaheim, CA, U.S.; Nov. 16, 2015-Nov. 20, 2015, Nov. 16, 2015 (Nov. 16, 2015), XP051007532, Retrieved from the Internet <URL:http://www.3gpp.org/ftp/Meetings_3GPP_SYNC/RAN3/Docs/> [retrieved on Nov. 16, 2015].
Huawei et al: "Introduction of Paging Optimisation and Paging for Coverage Enhancement capable UEs", vol. RAN WG3, no. St. Julian's, Malta; Feb. 15, 2016-Feb. 19, 2016, Mar. 6, 2016 (Mar. 6, 2016), XP051075949, Retrieved from the Internet <URL:http://www.3gpp.org/ftp/Meetings_3GPP_SYNC/RAN/Docs/> [retrieved on Mar. 6, 2016].
International Search Report PCT/ISA/210 for PCT/EP2016/080326 dated Feb. 16, 2017.
Written Opinion PCT/ISA/237 for PCT/EP2016/080326 dated Feb. 16, 2017.
Mexican Office Action dated Feb. 27, 2020 issued in corresponding Mexican Patent Application No. MX/a/2018/006963.
European Office Action dated Mar. 9, 2020 issued in European Patent Application No. 15 306 994.3-1231.

* cited by examiner

PAGING WITH OPTIMIZED TRANSMISSION RESOURCES IN A MOBILE NETWORK

CROSS-REFERENCE TO RELATED APPLICATIONS

This is a national phase under 35 U.S.C. § 371 of PCT International Application No. PCT/EP2016/080326 which has an International filing date of Dec. 8, 2016, which claims priority to European Application No. 15306994.3 filed Dec. 11, 2015, the entire contents of each of which are hereby incorporated by reference.

The present invention generally relates to mobile communication networks and systems.

Descriptions of mobile networks and systems can be found in the literature, such as in particular in Technical Specifications published by standardization bodies such as for example 3GPP (3$^{rd}$ Generation Partnership Project).

In a mobile system, a mobile terminal also called User Equipment UE, has access to a mobile network providing mobile communication services. A mobile network generally comprises a Core Network (CN) accessed via a Radio Access Network (RAN).

An example of 3GPP mobile system is EPS (Evolved Packet System), specified in particular in 3GPP TS 23.401. An EPS network comprises a Core Network called EPC (Evolved Packet Core) that can be accessed by a Radio Access Network (RAN) such as LTE-based RAN called E-UTRAN. EPC entities include Mobility Management Entity (MME) for E-UTRAN access to EPC. E-UTRAN entities include eNodeB (eNB). Each RAN entity controls one or more cells.

In such systems, mobility is supported by means of various mechanisms or procedures, such as in particular a paging procedure performed when there is a need to reach a User equipment UE in idle mode for an incoming call or session.

In EPS for example, when a downlink packet is received for an UE in idle mode, a network triggered service request procedure (recalled in FIG. 1 taken from 3GPP TS 23.401) is performed, including a paging procedure.

For E-UTRAN access to EPC for example, the paging procedure includes sending Paging messages by the MME serving the UE, on S1 interface, to eNBs belonging to a paging area included in the paging message (i.e. in release 12 of 3GPP the TAs in which the UE is registered), and paging the UE by the eNBs on the radio interface, in cells belonging to TAs in which the UE is registered.

As recognized by the inventors and as will be described with more details later, the current S1 Paging procedure does not allow for paging with optimized radio transmission resources. There is a need for paging optimization, including paging with optimized radio transmission resources. More generally, there is a need to improve performances of such systems.

Embodiments of the present invention in particular address such needs.

Embodiments of the invention are not limited to the E-UTRAN access to EPC case, and may be used in other cases, including GERAN/UTRAN access to EPC, 3GPP based systems other than EPS, or non-3GPP based systems.

These and other objects are achieved, in one aspect, by a Core Network CN entity such as Mobility Management Entity MME, capable of sending a paging request message such as S1 Paging message to a Radio Access Network RAN entity such as eNodeB, for paging a User Equipment UE, said CN entity configured to:

provide in a paging request message, control information enabling said CN entity to influence the consumption by said RAN entity of radio transmission resources for said paging.

These and other objects are achieved, in another aspect, by a Radio Access Network RAN entity, such as eNodeB, capable of receiving a paging request message such as S1 Paging message from a Core Network entity such as Mobility Management Entity MME, for paging a User Equipment UE, said RAN entity configured to:

receive a paging request message containing control information enabling said CN entity to influence the consumption by said RAN entity of radio transmission resources for said paging, determine transmission resources for said paging, taking into account said control information.

These and other objects are achieved, in another aspect, by method(s) for paging with optimized radio transmission resources in a mobile network, said method comprising at least one step performed by at least one of said CN entity and RAN entity.

Figure 2:
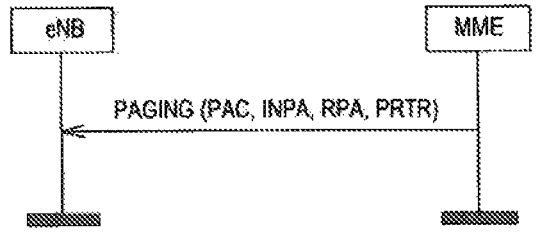
Figure 3:
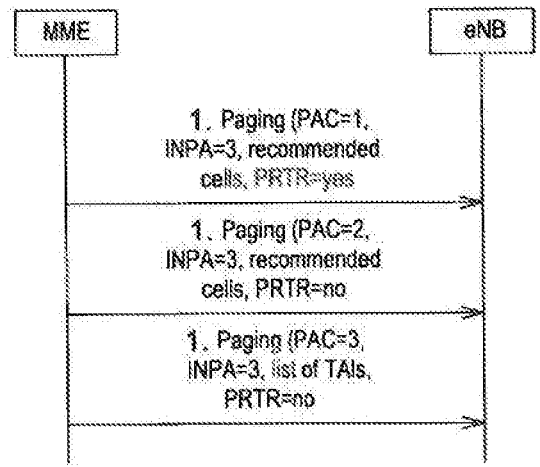
Figure 4:
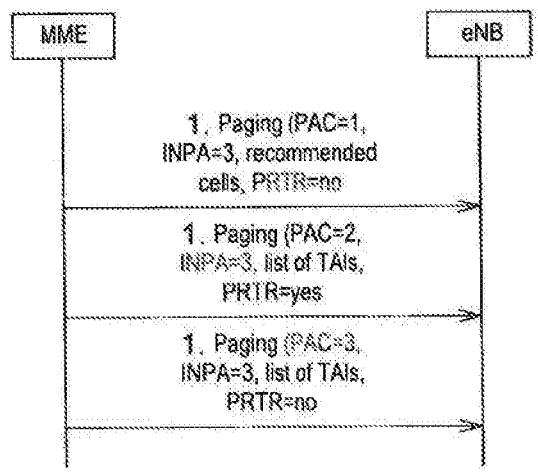

Some embodiments of apparatus and/or methods in accordance with embodiments of the present invention are now described, by way of example only, and with reference to the accompanying drawings, in which:

FIG. 1 is intended to recall paging performed for example during a network triggered service request procedure in EPS, FIG. 2 is intended to illustrate an example of Paging message sent by a Mobility Management Entity to a eNodeB, according to embodiments of the invention, FIG. 3 is intended to illustrate a first example of paging repetition scheme, according to embodiments of the invention, FIG. 4 is intended to illustrate a second example of paging repetition scheme, according to embodiments of the invention.

ABBREVIATIONS

BSC Base Station Controller
CN Core Network
eNB eNodeB
EPC Evolved Packet Core
EPS Evolved Packet System
E-UTRAN Evolved UMTS Terrestrial Radio Access Network
IE Information Element
INPA intended Number of Paging Attempts
LTE Long Term Evolution
MCS Modulation and Coding Scheme
MME Mobility Management Entity
PAC Paging Attempt Count
PRB Physical Resource Block
PRTR Paging at Reduced Transmission Resources
RAN Radio Access Network
RNC Radio Network Controller
RPA Recommended Paging Area
SGSN Serving GPRS Support Node
TA Tracking Area
UE User Equipment
UTRAN UMTS Terrestrial Radio Access Network

DESCRIPTION OF VARIOUS ASPECTS AND/OR EMBODIMENTS OF THE INVENTION

Following description of various aspects and/or embodiments of the invention will be made by way of example for E-UTRAN access to EPC. However, even if embodiments and/or aspects of the invention apply mainly to LTE (4G) technology, embodiments of the invention could apply to any cellular technology e.g. UTRAN, GERAN, 5G, etc.

In 4G networks, paging efficiency is key because of limitations of radio paging channel capacity. So far optimizations have concentrated on the localization aspect i.e. by improving the prediction of the area where the UE is likely located, one can reduce the paging area i.e. the number of eNBs and cells over which the radio paging message will be sent. By so doing one can save from paging uselessly in a number of cells thereby releasing the paging channel capacity in those cells.

However another dimension can be used to optimize the paging which is to optimize the number of radio transmission resources used in a given cell for a paging. For example most of time a UE is not at cell edge and the radio paging message could reach the UE by using a "light paging" which consumes fewer radio resources (e.g. lower MCS, fewer PRBs). This kind of optimization are however not easy to design because they would require careful repetition of the paging by the MME so that if the UE is at cell edge and could not be reached by a "light paging", a repeated "normal paging" (i.e. not light) can be sent to reach that UE. Also this kind of optimization would need to be standardized so that it works multi-vendor i.e. between MME of vendor A and eNB of vendor B in a way that improves the overall system efficiency regardless of the proprietary paging algorithms that vendor A has implemented for its MME and vendor B has implemented for its eNB.

A solution has been proposed in document R3-152869 where a Paging Attempt Information (PAI) is included in the paging message. This paging Attempt information includes a Paging Attempt Count (PAC) and may also include an Intended Number of Paging Attempts (INPA). This solution is not good enough because this PAI is included at the same level of the information called hereafter "recommended paging area" (RPA) (including list of TAIs or list of recommended cells) in the paging message, and included/set independently of each another. Therefore, when the MME repeats a paging message, the PAC gets incremented by one in each repetition regardless of the RPA indicated by the MME.

As a result, algorithms solely based on PAI value to perform "light paging" could lead to disastrous paging and degrade the situation instead of optimizing. This is because the two "dimensions of paging" can potentially vary simultaneously. Here is an example to illustrate this:

Imagine an MME which intends to page a UE successively with paging area 1 (made of 10 cells) and paging area 2 (made of 200 cells). MME intends to do 3 repetitions in total. In this typical case the MME evaluates at 80% that the UE is located in paging area 1, and evaluates at 100% that the UE is located in paging are 2.

MME decides the following algorithm for the 3 repetitions:

First paging (PAC set to 1) over paging area 1
Second paging (PAC set to 2) over paging area 2
Third paging (PAC set to 3) over paging area 2

Let's have the UE located at cell edge of one of the 10 cells (e.g. cell 3 managed by eNB3). An eNB is by definition stateless of successive pagings (does not keep knowledge of whether and how it has paged an UE). So eNB3 makes no correlation between the three paging repetitions from MME.

The algorithm of eNB3 (which is from different vendor than MME) can be:

First paging (PAC set to 1) the eNB makes a "light paging" therefore does not reach the UE. eNB assumes that the MME will make second paging including again paging area 1.

Second paging and third paging (PAC set to 2 then 3) the eNB makes "normal paging" to reach the UE In this example, eNB3 has made the wrong assumption that MME will not widen the paging area from paging area 1 into paging area 2 between the first and the second paging.

As a result, the second paging with normal (more costly) paging (which will reach the UE) will involve 200 cells instead of 10 cells.

As can be seen, if eNB3 had been aware of the paging strategy of the MME, it would have applied a "normal paging" as soon as the first paging and the UE would have been reached through a paging over 10 cells instead of resorting to a paging over 200 cells.

This simple example shows how damaging it can be to let the eNB apply an autonomous "light paging" or "resource efficient paging" strategy based on PAI whereas it doesn't know the strategy of the MME in terms of "paging area width" over the repetitions. In the example above, the paging is 20 less efficient, which is a disaster.

It should also be noted that the figures above are not exaggerated and are instead a typical use case. Indeed, typical paging areas used by MMEs are either optimized area according to a list of recommended cells (introduced in release 13 of 3GPP through the "Recommended Cell List IE") which can typically be 10 cells, followed by default paging areas of before release 13 which typically includes a list of TAIs (typically can reach 200 cells).

The discussion above has shown that it is not possible for an eNB to optimize a paging in radio transmission resources ("light paging") based only on PAI if it doesn't know how MME will make the paging area vary over the MME repetitions of the pagings.

Since only MME knows how it will change the paging area, embodiments of the invention therefore propose that the MME controls when the eNB will possibly take advantage of doing a "light paging" if eNB supports this function.

In some embodiments, the MME can simply add a new PRTR information element (Paging at Reduced Transmission Resources) in the paging request message (sent to the eNB), as illustrated in FIG. 2. The PRTR can be a Boolean "reduced resources/not reduced resources". If the PRTR is set to "reduced resources" the eNB will typically infer that MME recommends/allows to page at reduced resources.

As understood by the skilled person, a Boolean information as indicated above is only an example of control information enabling the CN entity (such as MME) to influence the consumption by the RAN entity (such as eNodeB) of radio transmission resources for paging the UE, and other examples are of course possible.

In some embodiments, a typical MME implementation would set the information element to "reduced resources" when MME plans to do a subsequent paging with identical (or almost identical) paging area after the current paging and therefore it is worth having the eNBs trying to optimize the radio transmission resources for that paging.

As understood by the skilled person, such typical implementation is only an example, and in a more general implementation, control information included in a paging request (such as S1 Paging message) to influence the RAN consumption of radio transmission resources may be set in relation with control information included in said paging request to control the paging area of said paging.

A first example of paging repetition scheme, according to embodiments of the invention, is illustrated in FIG. 3.

In this first example:

In first paging the MME includes PAC=1, INPA=3, paging area=list of recommended cells, PRTR=yes In second paging, the MME includes PAC=2, INPA=3, paging area=list of recommended cells, PRTR=no In third paging, the MME PAC=3, INPA=3, paging area=list of TAIs, PRTR=no In this first example, MME indicates during the first paging to eNB that it can try optimizing the paging because MME knows that the second paging will have same area. The third paging is the last one so MME recommends the eNB to NOT try optimizing the paging.

A second example of paging retransmission scheme, according to embodiments of the invention, is illustrated in FIG. 4.

In this second example:

In first paging the MME includes PAC=1, INPA=3, paging area=list of recommended cells, PRTR=no In second paging, the MME includes PAC=2, INPA=3, paging area=list of TAIs, PRTR=yes In third paging, the MME includes PAC=3, INPA=3, paging area=list of TAIs, PRTR=no In this second example, MME indicates during the first paging to eNB that it recommends the eNB to NOT try optimizing the paging because the following one will be over a much larger area. In contrast, for the second aging, MME can recommend eNB to optimize the radio paging because MME knows that there will be a third paging which will have the same paging area as the second paging.

Embodiments of the invention allow a paged eNB to optimize the radio paging in terms of radio transmission resources which it involves during the radio paging. Embodiments of the invention allow to optimize the paging resources system wide both in terms of paging area covered and number of radio transmission resources involved in each cell, at the same time, with an optimized coupling between these two dimensions.

The optimization of the eNBs in terms of radio transmission resources which are involved during the radio paging is done under the control of the MME by a direct recommendation/allowance sent by MME to the eNB to use this feature.

By so doing this leads to the overall system optimization of the paging both in terms of paging area and radio transmission resources. In contrast, in the current (above-recalled) solution, the eNB can only decide to use the radio optimization feature based on included Paging Attempt Count without knowing how MME will make the paging area vary over time. This can lead to opposite effect of degradation of paging resources system wide.

Various aspects of the invention include (though not being limited to) following aspects.

One aspect is a Core Network CN entity, such as MME or SGSN or 5G Core Controller, capable of sending a Paging message to a Radio Access Network entity, such as eNB or RNC or BSC or 5G RAN entity, for paging of a User Equipment UE.

Various embodiments may be provided, including (though not being limited to) following embodiments, which may be taken alone or in combination, according to various combinations.

In an embodiment, said CN entity is configured to:
provide in a paging request message, control information enabling said CN entity to influence the consumption by said RAN entity of radio transmission resources for said paging.

In an embodiment:
said control information includes a Boolean information indicating either allowing/recommending paging at reduced transmission resources, or not recommending paging at reduced transmission resources.

In an embodiment, said CN entity is configured to:
provide said control information in successive paging request messages sent to said RAN entity for paging said UE in case of paging repetitions, to influence the consumption by said RAN entity of radio transmission resources during each paging repetition.

In an embodiment, said CN entity is configured to:
provide in a paging request message, additional control information enabling said CN entity to control the paging area width for said paging,
provide said control information to influence the RAN consumption of radio transmission resources, said control information being set in relation with the control information included to control the paging area of said paging.

Another aspect is a Radio Access Network RAN entity, such as eNB or RNC or BSC or their 5G equivalent, capable of receiving a Paging message from a Core Network entity such as MME or SGSN or from a 5G Core controller, for paging of a User Equipment UE.

Various embodiments may be provided, including (though not being limited to):

In an embodiment, said RAN entity is configured to:
receive a paging request message containing control information enabling said CN entity to influence the consumption by said RAN entity of radio transmission resources for said paging,
determine radio transmission resources for said paging, taking into account said control information.

In an embodiment:
said control information includes a Boolean information indicating either paging at reduced transmission resources is allowed/recommended, or not recommending paging at reduced transmission resources.

In an embodiment, said RAN entity is configured to:
receive said control information in successive paging request messages sent to said RAN entity for paging said UE in case of paging repetitions, to influence the consumption by said RAN entity of radio transmission resources during each paging repetition.

In an embodiment, said RAN entity is configured to:
receive in said paging request message, additional control information enabling said CN entity to control the paging area width for said paging.

Other aspects relate to a method for paging with optimized radio transmission resources in a mobile network, said method comprising at least one step performed by at least one of the thus configured CN entity and RAN entity.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus, comprising:
   at least one processor; and
   at least one memory including computer program code,
   the at least one memory and the computer program code configured to, with the at least one processor, cause the apparatus at least to,
      send paging request messages to a radio access network entity, for paging a user equipment according to a paging repetition scheme, and
      provide in a paging request message, control information allowing said radio access network entity to optimize radio transmission resources for said paging, said control information including,
         a paging attempt count,
         an intended number of paging attempts,
         a paging area, and
         information indicative of a change in the paging area from a previous paging attempt.

2. The apparatus according to claim 1, wherein:
   said information indicative of a change in the paging area indicates if the paging area will be the same at a next paging attempt.

3. The apparatus according to claim 1, wherein:
   said paging area includes one of, a list of recommended cells, or a list of tracking areas.

4. The apparatus according to claim 1, comprising:
   a mobility management entity, configured to send S1 paging messages to a eNodeB (eNB).

5. An apparatus, comprising:
   at least one processor; and
   at least one memory including computer program code,
   the at least one memory and the computer program code configured to, with the at least one processor, cause the apparatus at least to,
      receive paging request messages from a core network entity, for paging a user equipment according to a paging repetition scheme, and
      receive in a paging request message control information allowing said apparatus to optimize radio transmission resources for said paging, said control information including,
         a paging attempt count,
         an intended number of paging attempts,
         a paging area, and
         information indicative of a change in the paging area from a previous paging attempt.

6. The apparatus according to claim 5, wherein:
   said information indicative of a change in the paging area indicates if the paging area will be the same at a next paging attempt.

7. The apparatus according to claim 5, wherein:
   said paging area includes one of, a list of recommended cells, or a list of tracking areas.

8. The apparatus according to claim 5, comprising:
   a eNodeB (eNB), configured to receive S1 paging messages from a mobility management entity.

9. A method comprising:
   receiving paging request messages from a core network entity, for paging a user equipment according to a paging repetition scheme, and
   receiving, in a paging request message, control information allowing a radio access network entity to optimize radio transmission resources for said paging, said control information including,
      a paging attempt count,
      an intended number of paging attempts,
      a paging area, and
      information indicative of a change in the paging area from a previous paging attempt.

* * * * *